(12) United States Patent
Baxter et al.

(10) Patent No.: US 11,980,180 B2
(45) Date of Patent: May 14, 2024

(54) PENDULUM BOOM SUSPENSION

(71) Applicant: Deere & Company, Moline, IL (US)

(72) Inventors: Garry E. Baxter, Ankeny, IA (US);
Daniel J. Koenen, Ankeny, IA (US);
Jacob J. Schultes, Urbandale, IA (US);
Brenden L Stephens, Urbandale, IA (US); Micah E. Johnson, Ankeny, IA (US)

(73) Assignee: Deere & Company, Moline, IL (US)

( * ) Notice: Subject to any disclaimer, the term of this patent is extended or adjusted under 35 U.S.C. 154(b) by 549 days.

(21) Appl. No.: 17/181,274

(22) Filed: Feb. 22, 2021

(65) Prior Publication Data

US 2021/0274770 A1  Sep. 9, 2021

Related U.S. Application Data

(60) Provisional application No. 62/985,060, filed on Mar. 4, 2020.

(51) Int. Cl.
*A01M 7/00* (2006.01)
*A01C 23/00* (2006.01)
(Continued)

(52) U.S. Cl.
CPC ......... *A01M 7/0053* (2013.01); *A01C 23/008* (2013.01); *A01M 7/0082* (2013.01); *B05B 1/20* (2013.01); *B05B 15/62* (2018.02)

(58) Field of Classification Search
CPC ... A01M 7/0053; A01M 7/0082; B05B 15/62; B05B 1/20; A01C 23/008
(Continued)

(56) References Cited

U.S. PATENT DOCUMENTS 5,375,767 A * 12/1994 Thorstensson ...... A01M 7/0053
239/164
6,234,407 B1  5/2001 Knight et al.
(Continued)

FOREIGN PATENT DOCUMENTS

DE  20018716 U1  5/2001
DE  202007011631 U1  10/2007
(Continued)

OTHER PUBLICATIONS

Extended European Search Report and Written Opinion issued in European Patent Application No. 21159627.5, dated Jul. 8, 2021, in 08 pages.

*Primary Examiner* — Steven J Ganey
(74) *Attorney, Agent, or Firm* — Tucker Ellis LLP; Michael G. Craig; Heather M. Barnes

(57) ABSTRACT

One or more techniques and/or systems are disclosed for a suspended center frame attached to boom wings, and coupled to a fixed center frame. A suspended center frame can be suspended from a fixed center frame with a bearing at a pivot point to allow for pivoting in multiple axes. The suspended frame can comprise one or more dampers that are operably, pivotably coupled with the fixed frame to dampen movement of the suspended frame in the roll axis; and one or more connecting links that are operably, pivotably coupled with the fixed frame to control movement of the suspended frame in the yaw and/or pitch axis. The pivot point can be located above the center of gravity of a suspended portion of the system, and proximate a top portion of the fixed frame; and the links and dampers can be disposed at a bottom portion of the suspended frame.

20 Claims, 12 Drawing Sheets

(51) Int. Cl.
    *B05B 1/20*           (2006.01)
    *B05B 15/62*        (2018.01)

(58) Field of Classification Search
    USPC .................................................. 239/159–166
    See application file for complete search history.

(56) References Cited

U.S. PATENT DOCUMENTS

| | | |
|---|---|---|
| 6,491,234 B2 | 12/2002 | Beggs |
| 6,834,223 B2 | 12/2004 | Strelioff et al. |
| 7,021,396 B2* | 4/2006 | Steinberger ............ A01B 61/02 |
| | | 239/164 |
| 7,395,663 B2 | 7/2008 | Thompson et al. |
| 7,878,422 B2* | 2/2011 | Heiniger ................. F15B 1/021 |
| | | 239/163 |
| 8,998,106 B2 | 4/2015 | Joris |
| 9,204,626 B2 | 12/2015 | Vitali et al. |
| 10,244,747 B2 | 4/2019 | Leeb et al. |

FOREIGN PATENT DOCUMENTS

| | | |
|---|---|---|
| EP | 1444894 A1 | 8/2004 |
| EP | 1186233 A3 | 1/2005 |
| EP | 2142306 B1 | 1/2013 |
| EP | 3075246 A1 | 10/2016 |
| EP | 2932841 B1 | 1/2017 |
| EP | 3337317 B1 | 7/2019 |
| FR | 2813212 A1 | 3/2002 |
| FR | 2896949 A1 | 8/2007 |

* cited by examiner

PENDULUM BOOM SUSPENSION

CROSS-REFERENCE TO RELATED APPLICATION(S)

This application claims priority to U.S. Ser. No. 62/985,060, entitled PENDULUM BOOM SUSPENSION, filed Mar. 4, 2020, of which is incorporated herein by reference.

BACKGROUND

Agricultural field sprayers are used to apply agricultural products onto a field. Field sprayers can be a self-propelled vehicle or towed/hitched to a towing vehicle, such as a tractor. A sprayer can have a wide applicator boom that is typically folded for transport, and on which nozzles for application of the product are distributed along the length of the boom. Applied products are typically liquids that serve to fertilize seed and plants or to combat weeds, diseases, or pests. The applied product is typically intended to be applied in predetermined amounts per unit of area over a field. In order to apply a desired amount effectively the applicator boom is moved over the ground at a predetermined, specified height. For example, if the applicator boom is too high, the product may be distributed over an area greater than desired, and if it is too low the product may be released in an area smaller than desired. The height and lateral tilt of the applicator boom can be varied and the tilt of the applicator boom may be remotely or manually controlled to guide the boom substantially parallel to the ground at a desired height. When the ground is uneven or when the field sprayer travels around a curve, the height may be compromised due to tilt of the boom, or oscillations of the boom.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for a suspended center frame attached to boom wings and suspended from a fixed center frame. For example, a suspended center frame can be suspended from a fixed center frame with a bearing coupling to allow for movement (e.g., pivoting) in multiple axes (e.g. pitch, roll, yaw). Further, links can connect either side of a lower portion of the suspended frame to the fixed frame, which can control the type and amount of movement about the shaft, and dampers may control the rate of pivoting. The pivot point can be located above a center of gravity of a suspended portion of the system, and the links and dampers can be used to dampen the yaw, pitch and roll of the suspended frame relative to the fixed frame.

In one implementation of a system for coupling a suspended boom frame to a fixed frame, a fixed frame can be operably, fixedly engaged to a sprayer vehicle. The fixed frame can comprise one or more controllable springs, and can comprise a fixed coupling that provides a pivot point. In this implementation, a suspended frame can operably couple with a pair of boom wings to form a suspended portion. The suspended frame can comprise a suspended coupling disposed above a center of gravity of the suspended portion. The suspended coupling can provide for pivoting of the suspended frame about the fixed coupling in roll, yaw, and pitch axes. The suspended frame can comprise one or more dampers operably, pivotably coupled with the fixed frame to dampen movement of the suspended frame in the roll axis. In this implementation, the one or more controllable springs can engage with the suspended frame to control a position of the suspended frame with respect to the fixed frame.

In another implementation, a suspended boom frame can comprise a pair of boom arms that, in conjunction with the suspended boom frame, form a suspended portion. Further, a suspended coupling can operably, pivotably couple with a fixed coupling on a fixed frame of a boom sprayer, where the suspended coupling is disposed centrally above a center of gravity of the suspended portion. Additionally, a pair of connecting links can respectively be operably disposed at opposing bottom corners of the suspended boom frame. The respective connecting links can extend forward to operably couple with the fixed frame at opposing sides to control yaw pivot and/or pitch pivot of the suspended frame. A pair of dampers can respectively, operably extend inward toward a central bottom of the fixed frame, and operably couple with the fixed frame to dampen roll pivot of the suspended frame.

In another implementation, a frame system for a boom sprayer can comprise a fixed central frame that is operably connected to a boom sprayer vehicle. A suspended frame, can be operably connected to a pair of boom sprayer wings on either side to form a suspended portion. The suspended frame can comprise a pivot point disposed above a center of gravity of the suspended portion. A suspended coupler can be fixedly engaged with the suspended frame at the pivot point. The suspended coupler can comprise a bearing operably, pivotably engaged with the fixed central frame to allow the suspended frame to pivot in yaw, roll, and pitch axes with respect to the fixed central frame. A pair of connecting links can respectively couple with the suspended frame at opposing bottom corners and extend forward and be coupled with the fixed frame to control yaw pivot and/or pitch pivot of the suspended frame. A pair of dampers can respectively couple between the suspended frame and a central bottom portion of the fixed frame to control roll pivot of the suspended frame.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1:
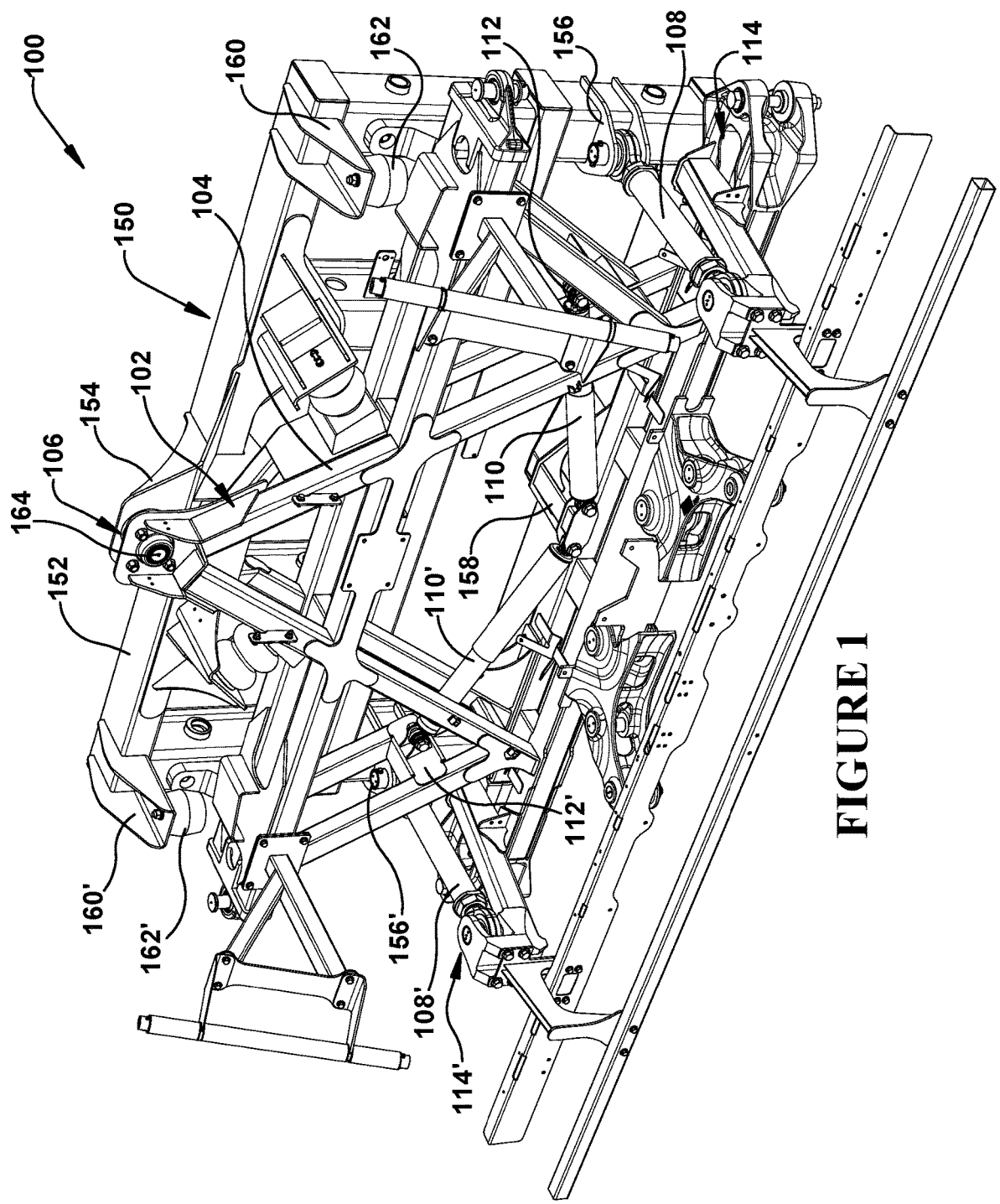
FIG. 1 is a component diagram illustrating one implementation of an example system 100 for coupling a suspended boom frame with a fixed frame.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A suspended center frame boom can be devised that is suspended from a fixed center frame. In one aspect, a suspended center frame of a boom-type agricultural sprayer can be suspended from a fixed center frame with a shaft and a spherical bearing to allow for movement (e.g., pivoting) in multiple axes, instead of just a fixed rotation of a typical pendulum. Further, links can connect either side of a lower portion of the suspended frame to the fixed frame, which can control the type and amount of movement about the shaft. In this aspect, the pivot point (e.g., shaft and bearing) can be located at a top portion (e.g., above a center of gravity of the suspended frame portion) of the suspended frame, for example, instead of at a center of gravity of the frame, which is often found in current, similar systems. In this aspect, the links can be used to dampen the roll of the suspended frame (e.g., and yaw and pitch), for example, instead of using fixed contact locations used in current systems.

Figure 2:
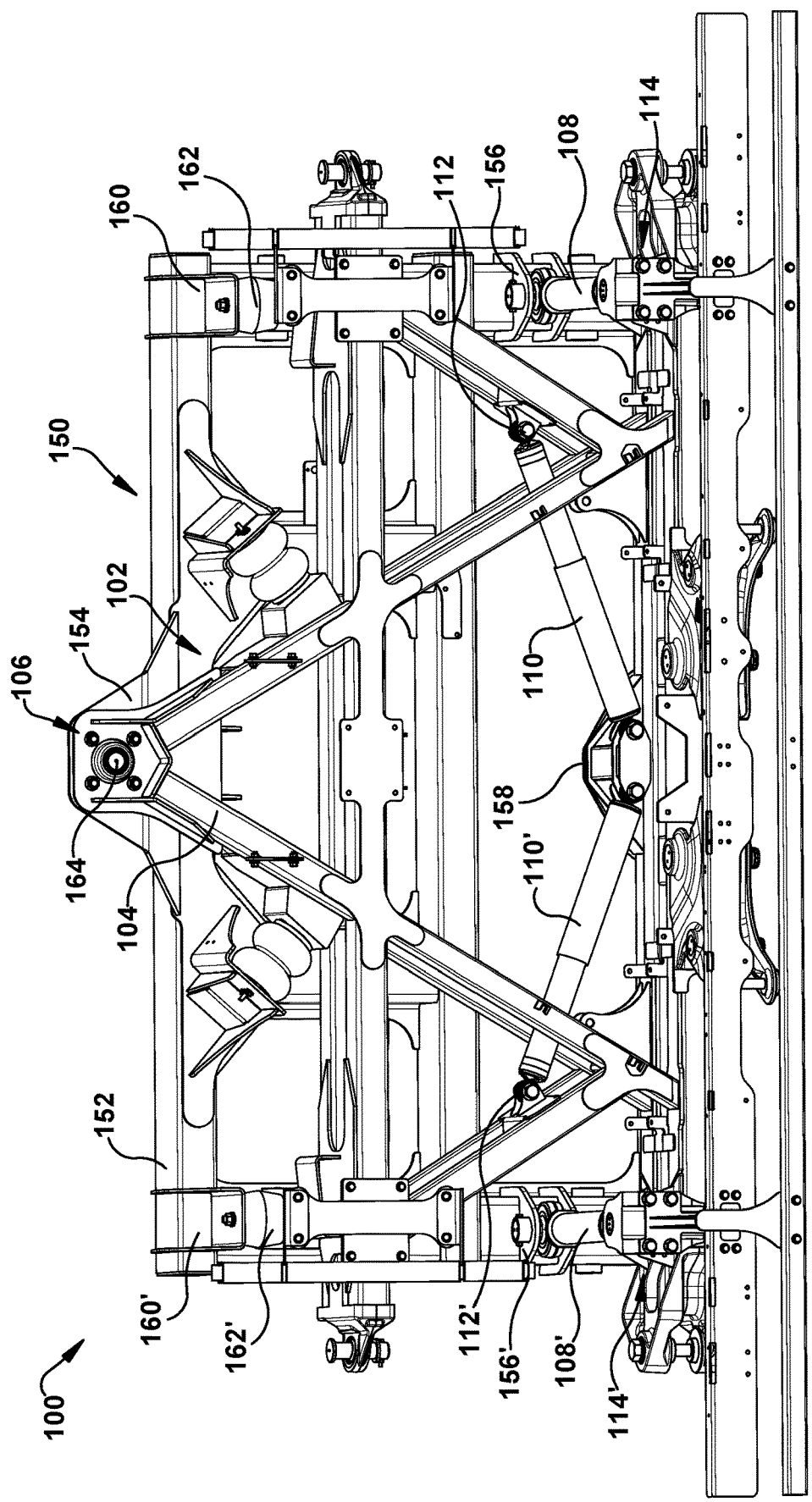
FIG. 2 is a component diagram illustrating one implementation of one or more portion of one or more systems described herein.

FIGS. 1 and 2 are component diagrams illustrating different views of one example implementation of a suspended frame system 100 for a boom sprayer, in accordance with systems disclosed herein. As illustrated in FIGS. 1 and 2, in the exemplary system 100, a fixed center frame 150 can be operably fixed to a sprayer apparatus, such as a self-propelled sprayer or one that is towed. The fixed center frame 150 is comprised of fixed framework 152 for support, brackets 154, 156, 156', 158 for connections between the fixed center frame 150 and a suspended frame 102, and one or more bumper brackets 160, 160' for supporting frame roll bumpers 162. One or more fixed link brackets 156, 156' can be disposed on either side of the fixed framework 152 to operably couple with connecting links 108, 108'. A fixed damper bracket 158 can be disposed centrally at a bottom portion of the fixed framework 152 to operably couple with one or more frame dampers 110, 110'. A top, fixed-frame coupling bracket 154 can be disposed centrally at a top portion of the fixed framework 152 to operably couple with the suspended frame 102.

The suspended frame 102 can be comprised of a suspended framework 104 that is suspended from a fixed coupling 106 at a top, central portion of the suspended frame 102. In this implementation, a shaft 164 can extend from the top, fixed-frame coupling bracket 154 (e.g., orthogonally from the fixed frame 150). Further, the shaft coupling 106 can be operably engaged with the shaft 164 to provide pivotal movement of the suspended frame 102 with respect to the fixed frame 150. Respective one or more dampers 110, 110' can be operably coupled with the suspended frame 102 at a suspended damper bracket 112, 112'. Respective one or more connecting links 108, 108' can be operably coupled with the suspended frame 102 at a suspended link bracket 114, 114'.

Figure 3A:
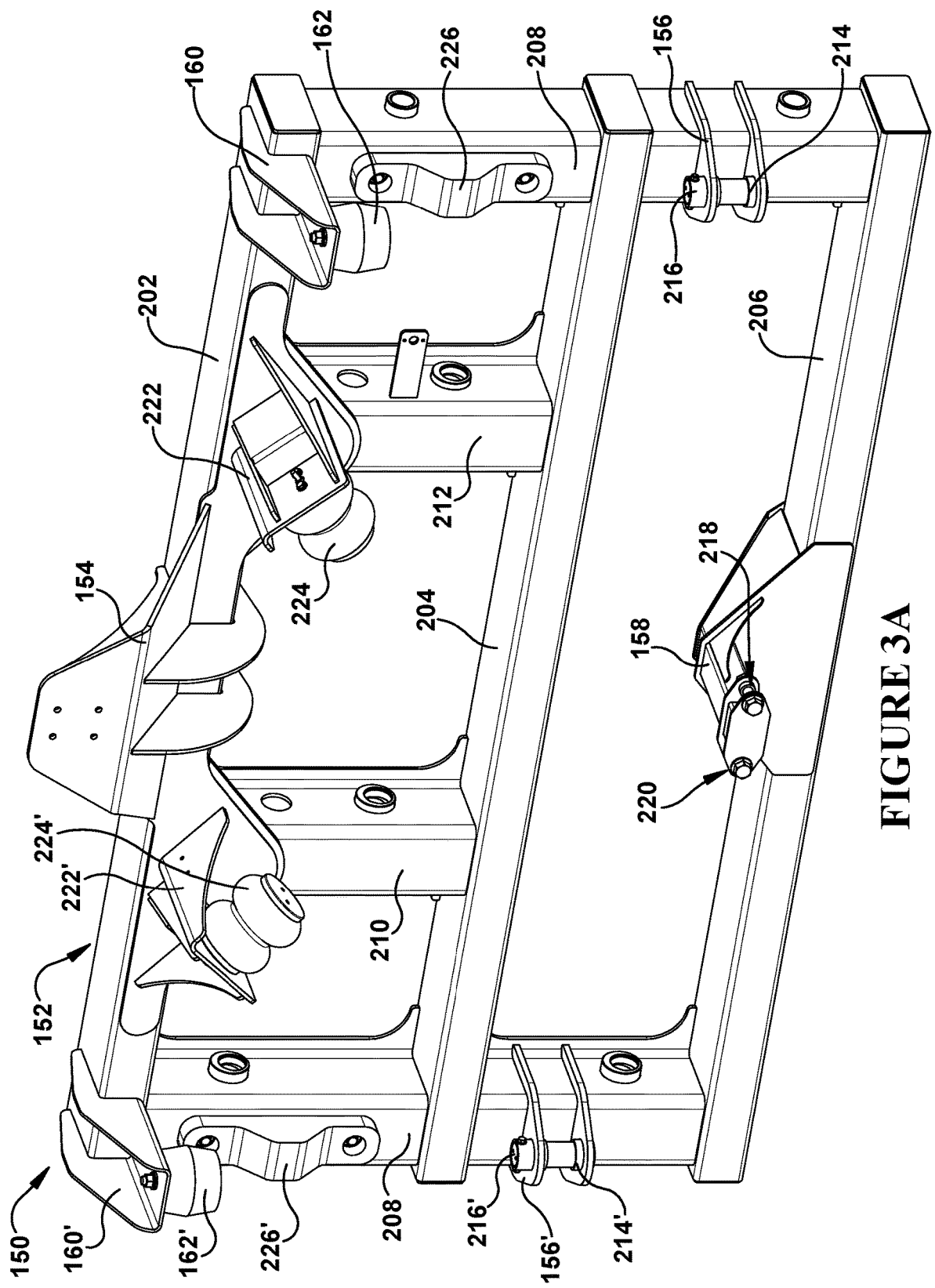
FIGS. 3A and 3B are component diagrams illustrating alternate implementations of one or more portion of one or more systems described herein.
Figure 3B:
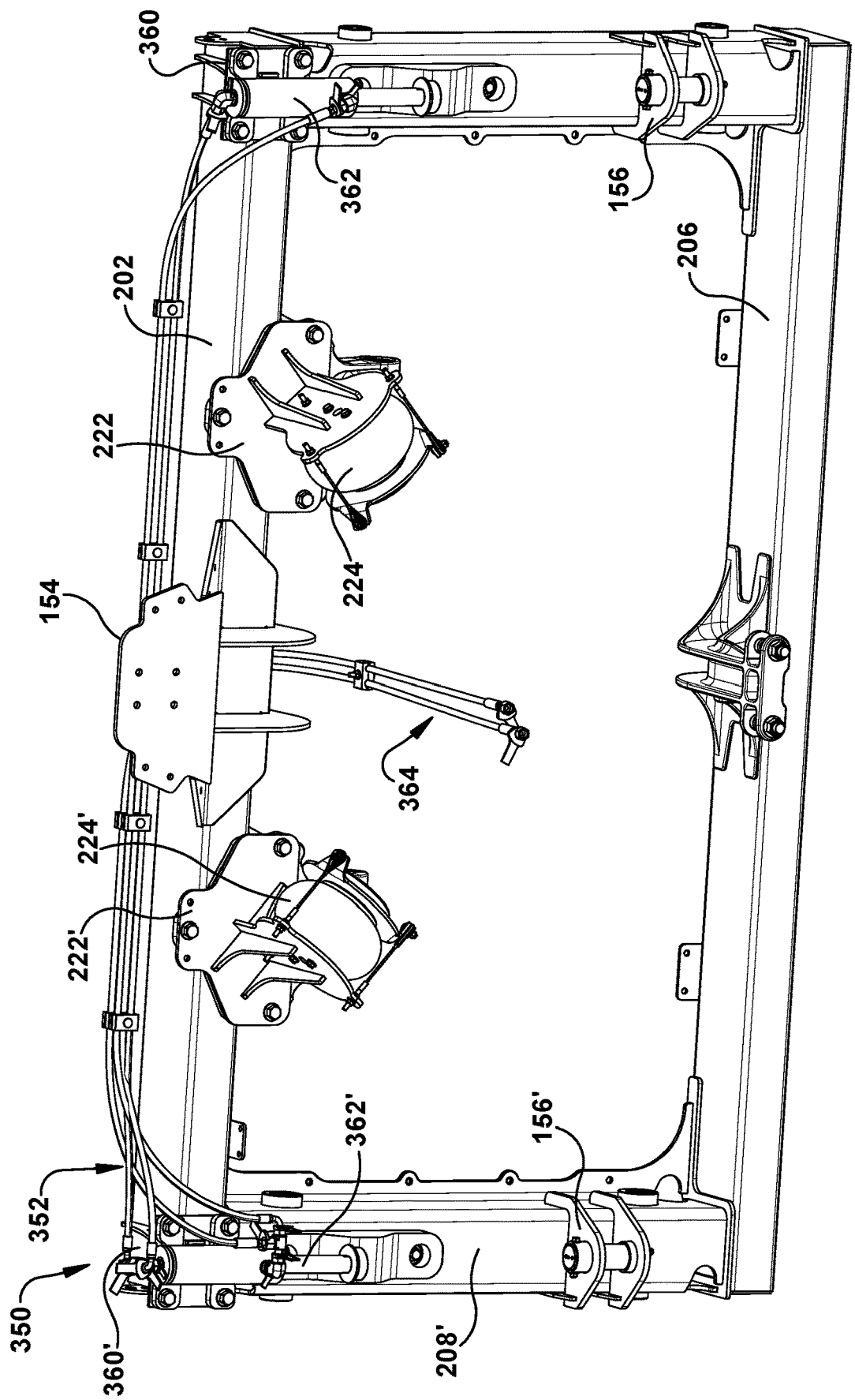

FIGS. 3A and 3B are component diagrams illustrating alternate implementations of one or more portions of a fixed frame 150, 350 of the exemplary system 100. With continued reference to FIGS. 1 and 2, in these implementations, the fixed framework 152, 352 comprises an upper cross-member 202, and lower cross-member 206. However, various alternates are envisioned for the fixed framework 152, such as more or fewer cross members, and/or alternate arrangements. For example, in some implementations, as illustrated in 3A, the fixed frame 150 can comprise a framework 152 with one or more mid cross-members 204 to provide additional support. Further, in these implementations, the fixed framework 152, 352 can also comprise a pair of vertical frame members 208, 208'. Again, this implementation is merely one embodiment of a fixed central frame; it is anticipated that alternate embodiments may be devised using sound engineering principles to serve the same or similar purpose. For example, as illustrated in FIG. 3A, in some implementations, one or more additional vertical members 210, 212 may be utilized to provide additional support to the framework 152.

The example fixed frame 150, 350 comprises the top, fixed-frame coupling bracket 154 that is fixedly engaged with the fixed framework at a central portion of the upper cross-member 202. The fixed-frame coupling bracket 154 is disposed proximate the top of the fixed frame 150, 350, and is configured to operably engage with a fixed coupling 106, coupled with a shaft 164, such as using one or more fasteners. Alternately, in some example, the fixed coupling 106 and shaft 164 can be fixed to the top, fixed-frame coupling bracket 154, such by welds or the like, and the top, fixed-frame coupling bracket 154 may be fastened to the top cross-member 202. The respective one or more fixed link brackets 156, 156' can be fixed to the fixed framework at corresponding vertical frame members 208, 208', such as by welding, or may be fixedly engaged by one or more fasteners. The respective one or more fixed link brackets 156, 156' can be configured to couple with an end of the corresponding link 108, 108', such as by receiving a pin 216, 216' through one or more coupling bores 214, 214', and the corresponding link 108, 108' (e.g., through a bore in the end of the link). Alternately, the coupling links 108, 108' can be coupled using a ball joint. In some implementations, the link 108, 108' is allowed to pivot with respect to the fixed link bracket 156, 156', for example, by pivoting about the pin 216, 216' in a vertical (e.g., yaw) axis, and/or pivoting about the pin 216, 216' in a horizontal (e.g., pitch) axis.

The fixed damper bracket 158 can be fixedly engaged with the fixed framework 152 at the lower cross-member 206, such as by welding or the like, or by fastening. The fixed damper bracket 158 can be configured to operably couple with the respective one or more dampers 110, 110' in a pivotal arrangement, such as in a roll axis, which allows the dampers 110, 110' to operably pivot about the coupling with the fixed damper bracket 158. In some implementations, the coupling between the fixed damper bracket 158 and damper 110, 110' can be implemented by a pin, rod, or fastener 218 that is disposed through one or more ball joints 220 engaged with (e.g., or through a bore in) the fixed damper bracket 158, and through a bore (e.g., or onto another ball joint) in the end of the damper 110, 110'.

As illustrated in FIG. 3A, one or more bumper brackets 160, 160' can be fixedly engaged (e.g., welded, fastened) to the fixed frame 152, such as at the upper cross member 202. A frame roll bumper 162, 162' can be disposed on respective brackets 160, 160', such as underneath. The frame roll bumpers 162, 162' can be configured to provide a stop (e.g., which may be cushioned) for the suspended frame 102, such as during a roll event (e.g., when the suspended frame pivots on the shaft 164). Alternately, as illustrated in FIG. 3B, one or more cylinder brackets 360, 360' can be fixedly engaged (e.g., welded, fastened) to the fixed frame 352, such as at the upper cross member 202. In this implementation, a hydraulic stop cylinder 362, 362' can be engaged with the respective cylinder brackets 360, 360'. The hydraulic stop cylinder 362, 362' can be configured to provide a stop (e.g., which may be pressurized) for the suspended frame 102, such as during a roll event (e.g., when the suspended frame pivots on the shaft 164). In some implementations, a hydraulic fluid supply system 364 can be coupled with the respective hydraulic stop cylinders 362, 362' to control the cylinders. For example, a cylinder can be extended and retracted to adjust the position of the stop for the suspended frame 102, by adjusting the length of the hydraulic stop cylinder 362, 362'.

Further, a pair of spring brackets 222, 222' (e.g., alternate arrangements in FIGS. 3A and 3B) can be engaged with the fixed frame, and respectively configured to operably hold a frame spring 224, 224'. In some implementations, the frame spring 224, 224' may comprise a rubber or polymer unit that provides a stop. As another example, the frame spring 224, 224' can comprise a controllable spring, such as an air spring, hydraulic cylinder, or some other spring that allows an amount of biasing force to be adjusted. That is, for example, the frame spring 224, 224' can be operably adjusted to increase or decrease an amount of force applied by the spring to a portion of the suspended frame 102. In operation, for example, compressed air can be added to a first air spring (e.g., 224'), and air can be released from a second air spring (e.g., 224), resulting in suspended frame 102 to be shifted (e.g., pivoted) to one side (e.g., the right side). As another example, a hydraulic spring (e.g., or other type of linear actuator) may be used in place of the air springs to perform a similar operation. In this way, for example, the frame spring 224, 224' can be used to recenter the suspended frame 102 with respect to the fixed frame 150, such as during traversal over varied terrain. Further the springs can help decelerate roll movement of the suspended frame, to mitigate violent and sudden shifts from side to side.

As illustrated in FIG. 3, one or more frame pitch bumpers 226, 226' can be fixed to the fixed frame 152, such as at respective vertical frame members 208, 208'. In some implementations, the frame pitch bumpers 226, 226' are configured to provide a stop (e.g., having a plate or cushion disposed thereon) for the suspended frame 102 when the suspended frame 102 pivots in a pitch axis (e.g., and/or in a yaw axis), which can result in the suspended frame 102 contacting the fixed frame 150. In this way, for example, the frame pitch bumpers 226, 226' may mitigate the suspended frame 102 contacting the fixed frame 150, as the suspended frame 102 can be stopped by the frame pitch bumpers 226, 226'.

Figure 4:
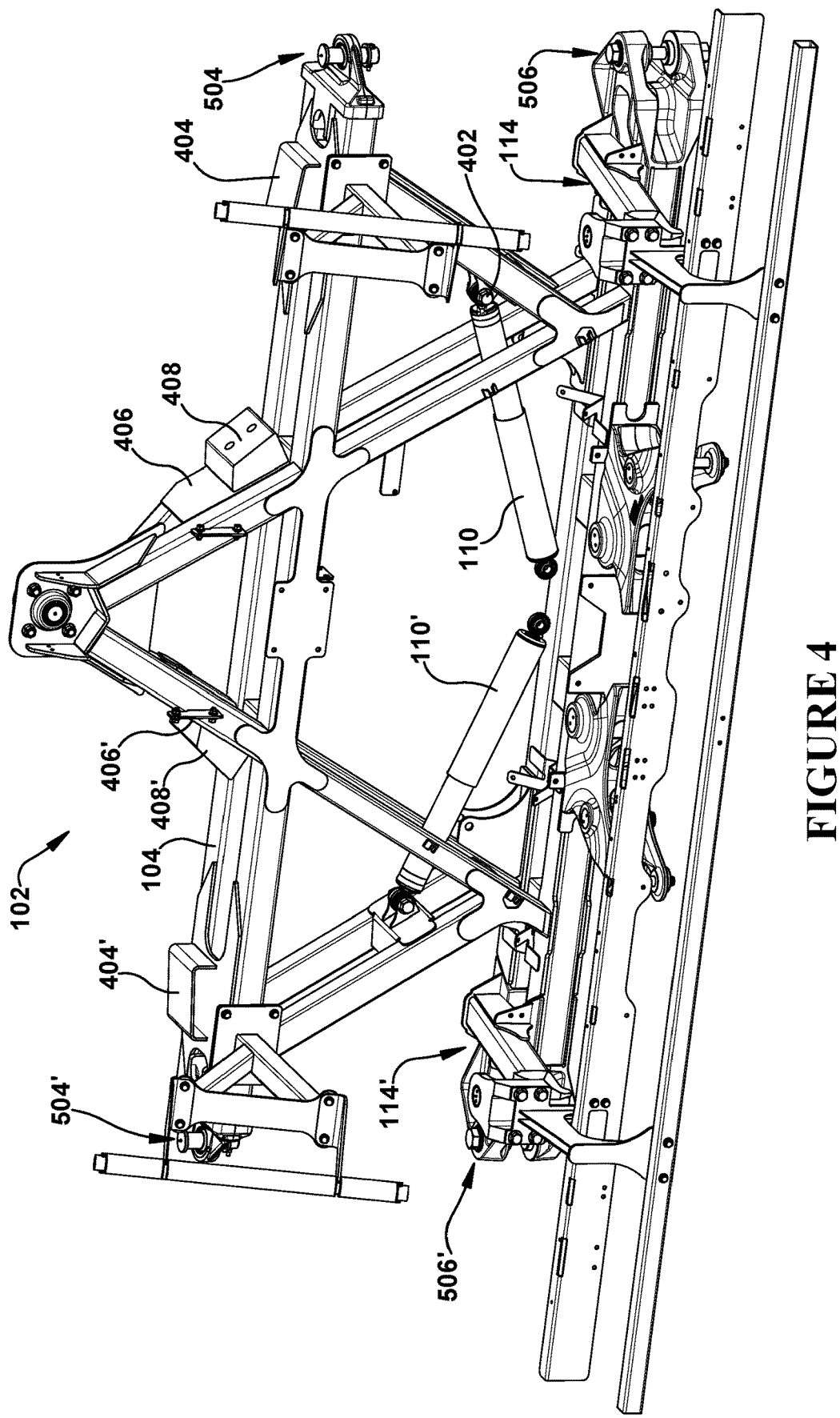
FIG. 4 is a component diagram illustrating one implementation of one or more portion of one or more systems described herein.
Figure 5A:
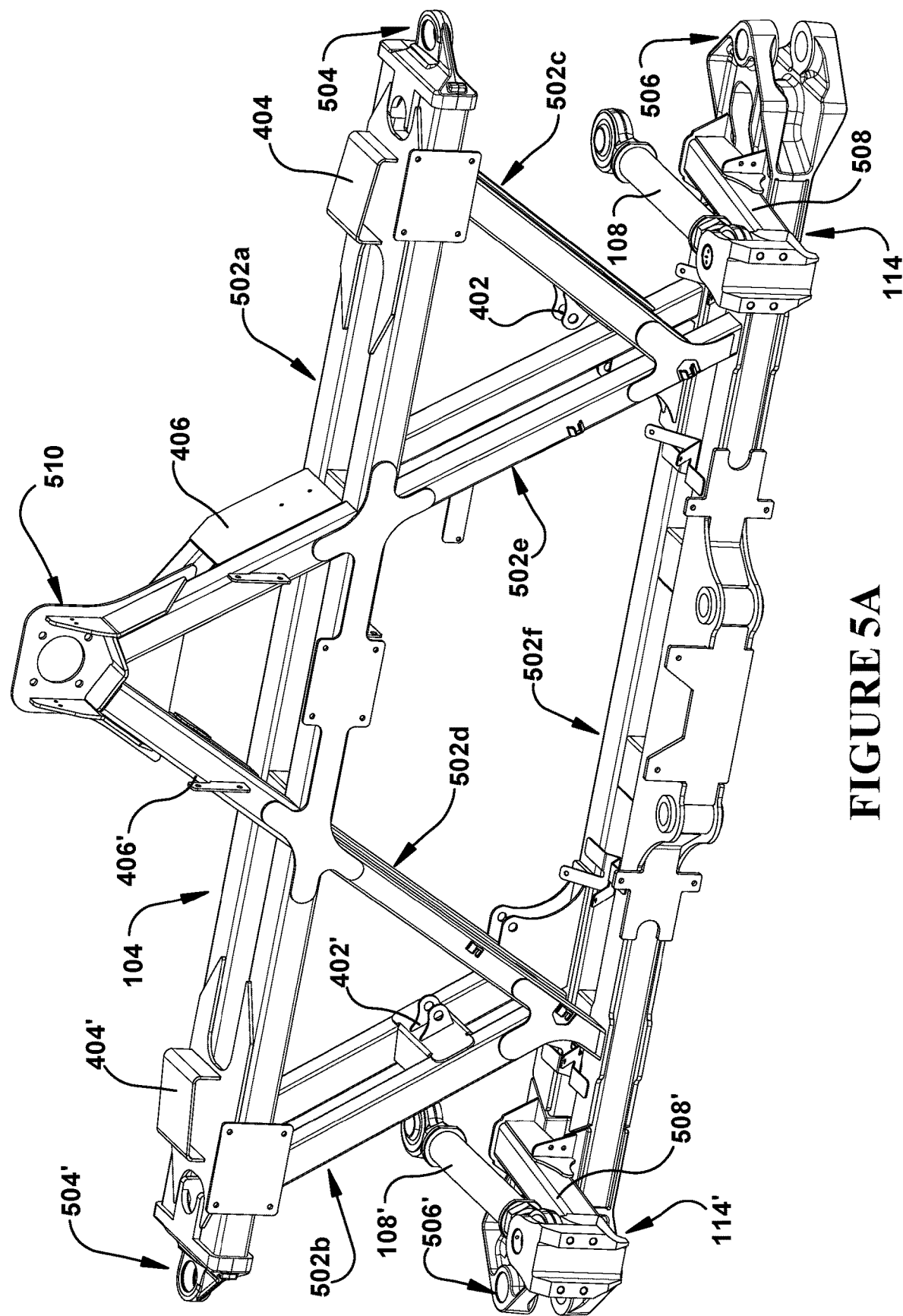
FIGS. 5A and 5B are component diagrams illustrating alternate implementations of one or more portion of one or more systems described herein.
Figure 5B:
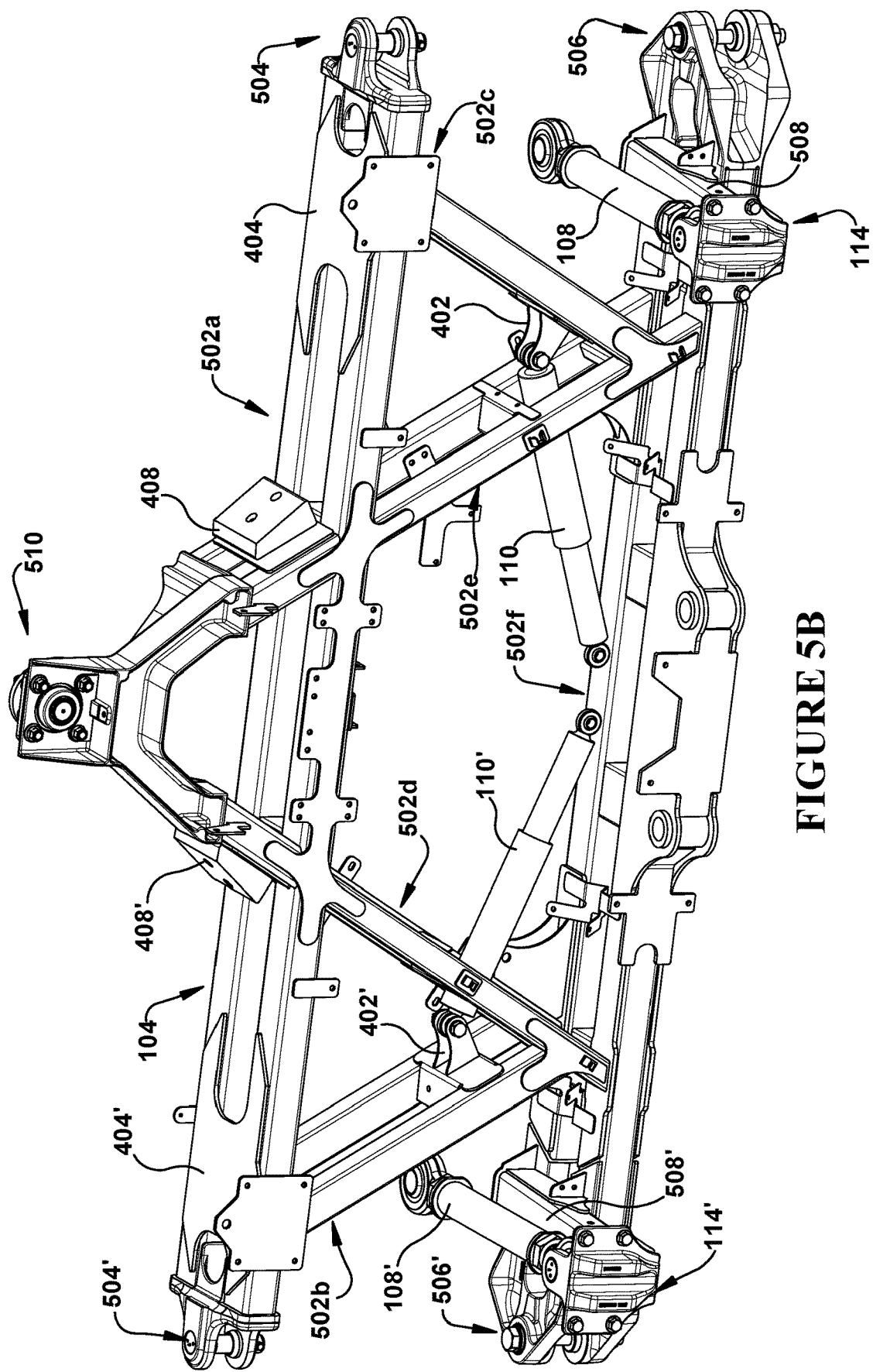

FIGS. 4, 5A, and 5B are component diagrams that illustrate alternate implementations of one or more portions of the suspended frame 102. FIG. 4 is one implementation of the suspended frame 102, FIG. 5A is one implementation of the suspended framework 104, and FIG. 5B is another alternate implementation of the suspended frameword 104. With continued reference to FIGS. 1-3, the suspended framework 104 can comprise a plurality of frame members 502*a-f*, which form the structural elements of the suspended framework 104. It should be appreciated that, while FIG. 5 illustrates one implementation of the arrangement of the frame members 502*a-f*, it is anticipated that alternate arrangements may be devised by those skilled in the art. The suspended framework 102 is configured to operably couple with a pair of boom arms (not shown), such as at the respective boom arm coupling brackets 504, 504', 506, 506'. That is, for example, a pair of upper boom arm coupling brackets 504, 504' may couple (e.g., pivotably) with upper portions of respective boom arms, and a pair of lower boom arm coupling brackets 506, 506' may couple with lower portions of respective boom arms.

Further, the suspended frame can comprise one or more suspended damper coupling brackets 402, 402' that are respectively configured to operably couple with a damper 110, 110' in a pivotal engagement (e.g., in a roll pivot arrangement). As an example, a pin may couple the respective suspended damper coupling brackets 402, 402' with the corresponding damper 110, 110'. In this way, for example, the dampers can operably dampen oscillation (e.g., side to side roll) of the suspended frame 102 with respect to the fixed frame 150, through the coupling of respective dampers 110, 110' between the suspended damper coupling brackets 402, 402' on the suspended frame 102 and the fixed damper bracket 158 engaged with the fixed framework 152.

Additionally, the suspended frame can comprise one or more suspended link coupling brackets 114, 114' that are configured to operably couple with a connecting link 108, 108', such as in a pivotal engagement (e.g., a yaw pivot, from side-to-side). As an example, a connecting link 108, 108' can be coupled with the corresponding suspended link coupling bracket 114, 114' using a pin or fastener that holds the coupling link 108, 108', or a ball joint, in pivotal engagement with the suspended link coupling bracket 114, 114'. In this way, for example, the other end of the connecting link 108, 108' can be engaged with the one or more fixed link brackets 156, 156' on the fixed frame 150, to operably connect the fixed frame 150 with the suspended frame 102 at or near the bottom of the suspended frame. In this way, for example, the coupled links 108, 108' can help operably mitigate undesired movement of the suspended frame 102, such as during a roll event.

In some implementations, as illustrated, the suspended link coupling brackets 114, 114' can comprise an extension arm 508', 508 that is fixed to the suspended frame 102, and extends (e.g., substantially orthogonally) rearward from the frame 102. In this implementation, the connecting link 108, 108' can be engaged with the coupling bracket 114, 114' at a rear end of the extension arm 508', 508. It should be appreciated that the length of the extension arm 508', 508 may be dependent on the length of the connecting link 108, 108'. That is, for example, a longer connecting link 108, 108' may result in a longer extension arm 508', 508. As an example, the length of the extension arm 508', 508 can be configured to operably dispose the other end of the connecting link 108, 108' in alignment with the fixed link brackets 156, 156' on the fixed frame 150.

It should be appreciated that the connecting links 108, 108' may comprise a solid link, damper, a hydraulic or air cylinder, 4-bar linkage, or the like, configured to mitigate yaw and/or pitch movement of the suspended frame 102 with respect to the fixed frame 150. During operation, for example, in some implementations the connecting links 108, 108' may lengthen and shorten based on the yaw or pitch movement, and may pivot left and right, up and down, depending on the roll movement of the suspended frame 102. In this way, the connecting links 108, 108' can mitigate yaw and/or pitch movement, and also may help mitigate roll movement. In some implementations, the connecting links 108, 108' may be controllable with respect to adjustment of their length. For example, a first connecting link 108 may be lengthened and a second connection link 108' may be shortened to adjust the position of the suspended frame 102 with respect to the fixed frame 150. Alternately, both connecting links 108, 108' may be either shortened or lengthened to adjust the frame's position.

In this way, for example, a rate of roll or movement of the suspended frame 102 can be controlled with respect to the fixed frame 150. As an example, controlling a rate of movement of the suspended frame 102 may be useful when the boom sprayer moves over uneven terrain, turns a corner, moves up or down a rise, or moves along the side of a hill. That is, for example, controlling the rate and type of movement of the suspended frame 102 may help keep the boom arms substantially level with the ground during operation.

As illustrated in FIGS. 4, 5A, and 5B one or more stop plates 404, 404' (e.g., alternate arrangements in FIGS. 5A and 5B) can be fixed to a top of the suspended framework 104. The stop plates 404, 404' can be configured to align with the respective frame roll bumpers 162, 162' or hydraulic stop cylinders 362, 362' coupled with the fixed frame 150. That is, for example, the stop plates can provide a stop (e.g., at approximately 8 to 10 degrees of roll) for the suspended frame when the suspended frame rolls from side to side. Further, one or more spring stop plates 406, 406' and/or spring stop bumpers 408, 408' can be fixedly engaged with the suspended framework 104. The spring stop plates 406, 406' and spring stop bumpers 408, 408' can be configured to provide a stop for the fixed frame springs 224, 224' when the suspended frame 102 rolls from side to side.

Figure 6:
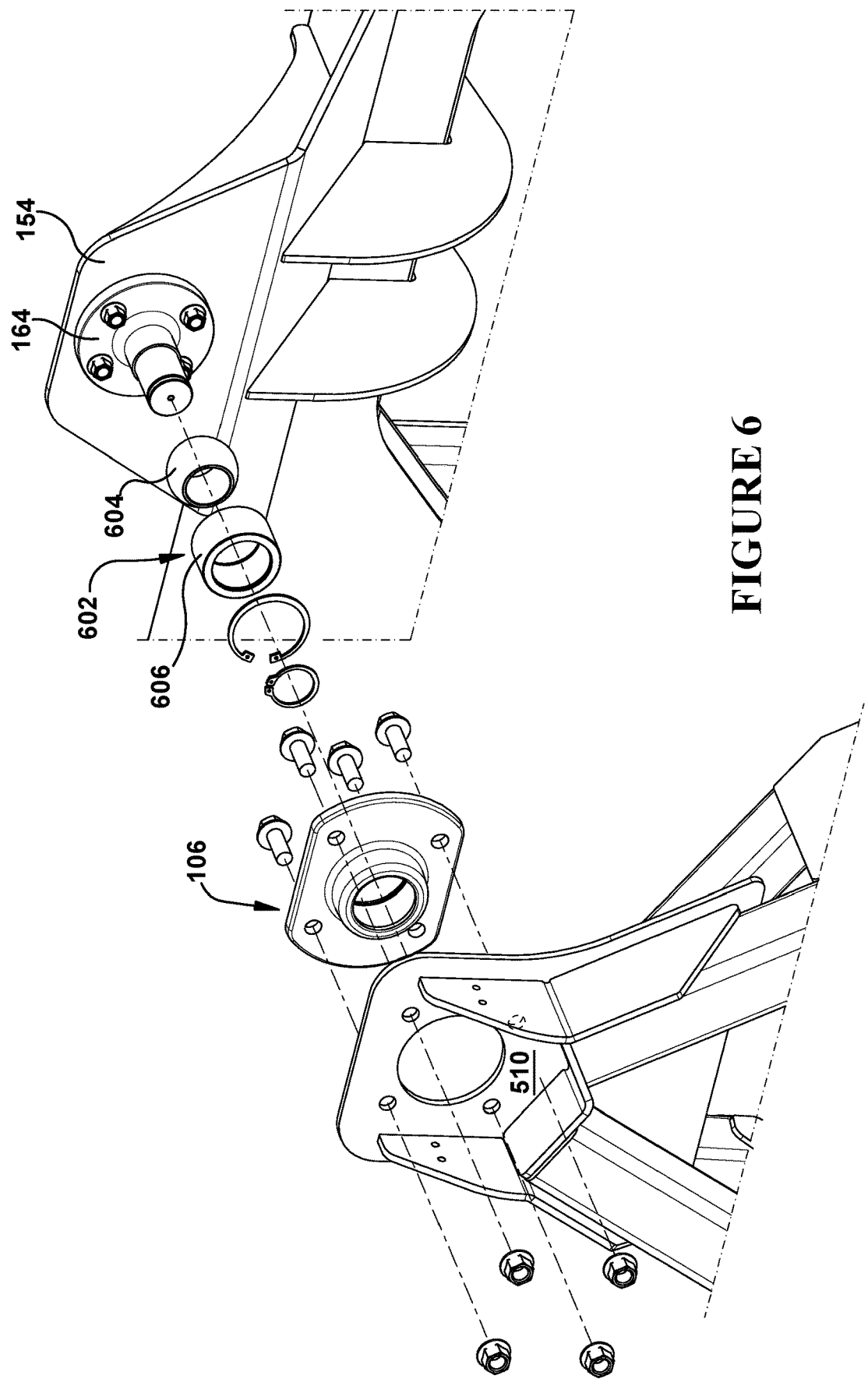
FIG. 6 is a component diagram illustrating one implementation of one or more portion of one or more systems described herein.
Figure 7:
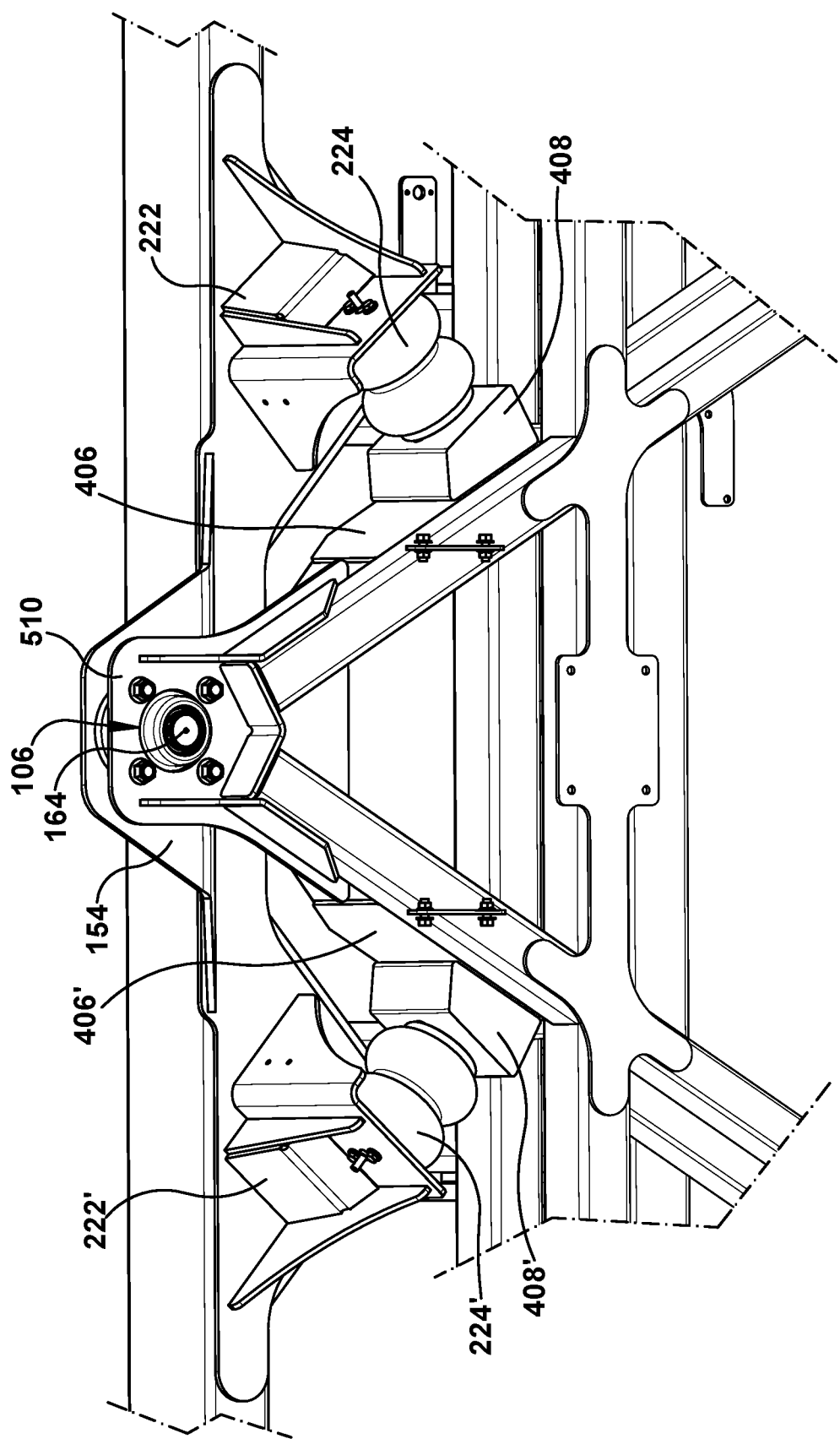
FIG. 7 is a component diagram illustrating one implementation of one or more portion of one or more systems described herein.

As illustrated in FIG. 6, with continued reference to FIGS. 1-5, a shaft coupling 106 is operably, fixedly engaged with a shaft 164 coupling bracket 510 disposed at a top of the suspended framework 104 of the suspended frame 102. In this implementation, a shaft 164 can be operably, fixedly engaged with the top, fixed-frame coupling bracket 154, such as with one or more fasteners, or it may be otherwise fixed by welding, etc. In this implementation, the shaft coupling 106 can comprise a bearing 602 that provides for reduced friction between the shaft 164 and a shaft coupling 106. In one implementation, the bearing 602 can comprise a spherical bearing 604 (e.g., or similar) that is operably, fixedly engaged with the shaft 164, such as by friction fit, keyway fit, and/or using one or more clips. That is, the spherical bearing 604 can operably remain stationary and affixed to the shaft 164. Further, the bearing 602 can comprise a raceway 606 that is movably coupled with the spherical bearing 604, such that the raceway 606 can operably rotate and pivot around the spherical bearing 604. For example, the raceway 606 can comprise a concave internal wall that is complementary to the rounded surface of the spherical bearing 604 to allow for reduced friction movement in a variety of directions (e.g., roll, yaw, pitch axes).

In one implementation, the bearing 602, with the raceway 606 and spherical bearing 604, can be fixedly engaged with the shaft coupling 106, such as by friction fit, or using clips, fasteners, etc. The shaft coupling 106 can be operably engaged with the shaft 164, such that the spherical bearing 604 is operably fixed on the shaft 164, and the raceway 606 is operably fixed in the shaft coupling 106. The shaft coupling 106 can be fastened to the coupling bracket 510 that is operably fixed to the suspended framework 104. For example, the shaft coupling 106 with the bearing 602 operably allows the suspended frame 102 to pivot in multiple directions (e.g., yaw, roll, pitch) around the shaft 164, by way of the spherical bearing 604.

As an exemplary implementation, as illustrated in FIGS. 7-10, in operation a pair of boom wings 1004, 1006 can be engaged with the suspended frame 102. The fixed frame 150 can be engaged with a sprayer 1002 (e.g., self-propelled or towed), and the suspended frame 102 can be pivotably engaged with the fixed frame 150, and the suspended framework 104 can be coupled to the fixed framework 150 by the connecting links 108, 108' and dampers 110, 110'. During operation, for example, as the sprayer 1002 traverses a field, the sprayer 1002 engaged with the fixed frame 150 may roll from side to side, pitch up and down, and turn from side to side. In this example, the inertia of the suspended frame 102 and coupled boom wings 1004, 1006 can result in the suspended frame 102 pivoting in a pitch, roll and/or yaw axis with respect to the fixed frame 150.

Figure 8:
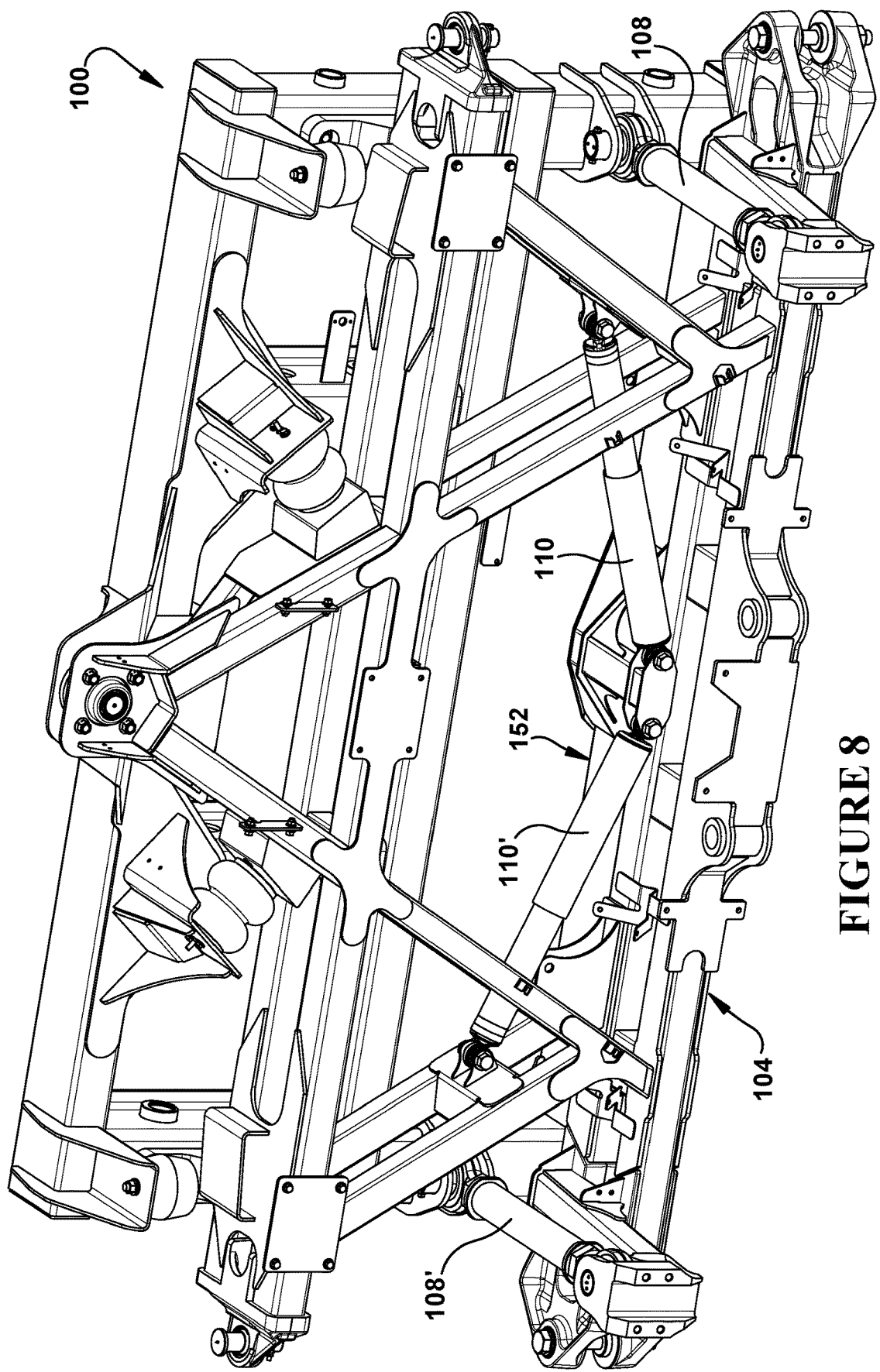
FIG. 8 is a component diagram illustrating one implementation of one or more portion of one or more systems described herein.
Figure 9:
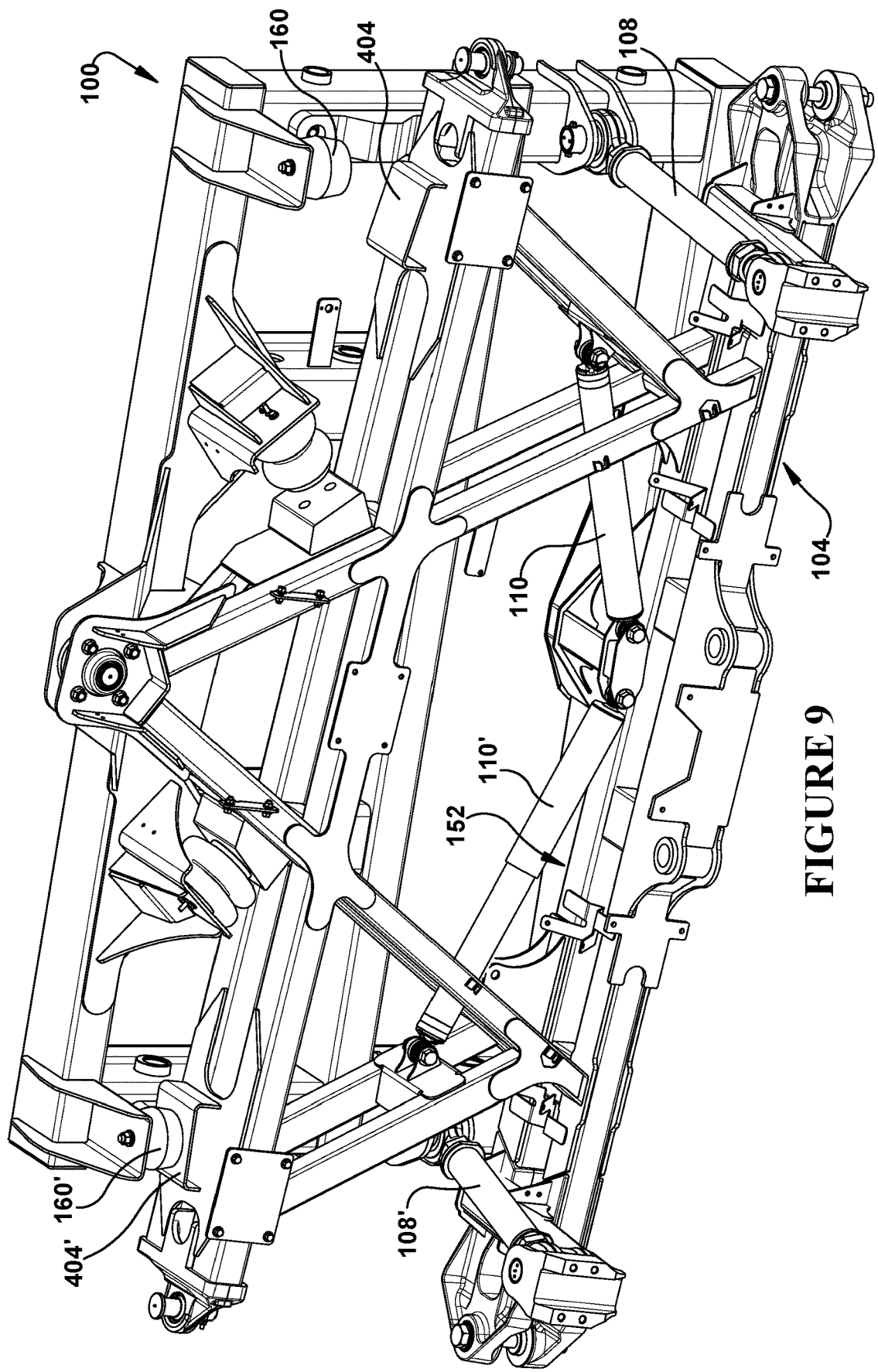
FIG. 9 is a component diagram illustrating one implementation of one or more portion of one or more systems described herein.
Figure 10:
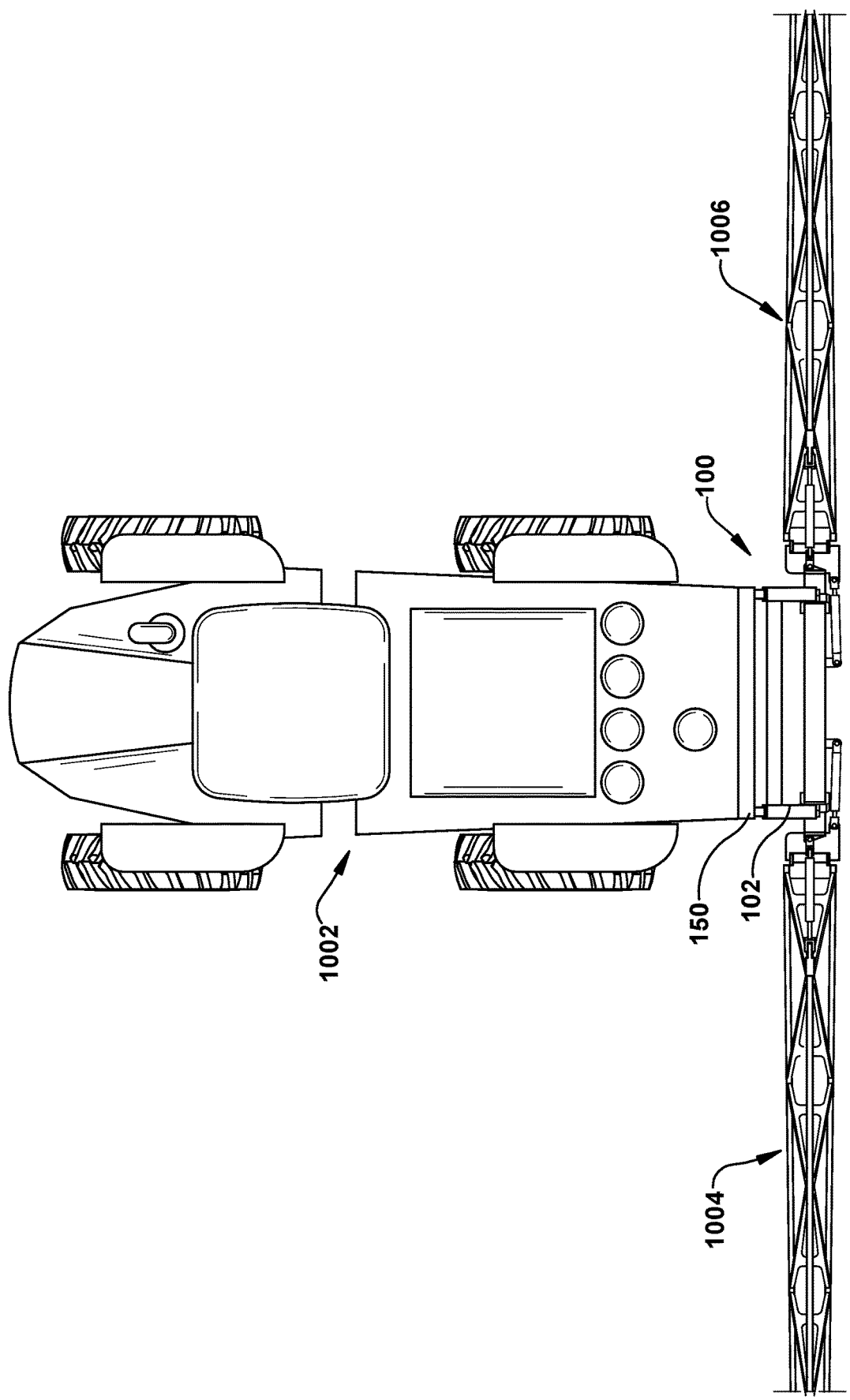
FIG. 10 is a component diagram illustrating one implementation of one or more portion of one or more systems described herein.

In this example, in an effort to keep the boom wings 1004, 1006 relatively parallel to the ground when traveling over uneven ground, along the side of a hill, or in a turn, air springs 224, 224' may be used to adjust the position of the suspended frame 102 with respect to the fixed frame 150. That is, the air spring 224 is fixed to the spring bracket 222 on the fixed framework 152. The spring 224 can be activated by adding air pressure, which reduces an amount of pivot travel of the suspended frame 102, as the spring 224 impact the spring stop bumper 408 on the spring stop plates 406. Further, as illustrated in FIG. 8 showing the suspended framework 104 in a neutral position with respect to the fixed framework 150 (e.g., centered). In FIG. 9, the suspended framework 104 is shown pivoted to the left in a clockwise direction with respect to the stationary framework 152.

In this implementation, the left damper 110' is extended and the right damper 110 is retracted. The dampers 110 reduce the rate of pivot in the roll axis (e.g., mitigate oscillation). In some implementations, the dampers 110, 110' can be adjusted to adjust the dampening coefficient, for example, to control the rate of pivot to a desired rate. Further, the left 108' and right 108 connection links are skewed, and help reduce the rate of pivot in the yaw direction. Of note, the left bumper 160' is in contact with the left bumper stop 404', mitigating roll of the suspended frame past the left bumper stop 404' (e.g., about eight degrees of roll).

During operation, the center of gravity of the system 100, while coupled with boom wings 1004, 1006 can be disposed behind the fixed frame 150, such as at the pivot point of the shaft 164 and shaft coupling 106. In this way, for example, in a neutral position (e.g., on flat ground), the suspended frame 102 may be disposed in substantially central alignment with the fixed frame 150. That is, for example, in the neutral position the suspended frame is not subject to roll, yaw or pitch pivoting. As another example, when the boom wings 1004, 1006 are folded forward, the center of gravity may be disposed forward of the pivot point, resulting in the suspended frame pivoted in a yaw axis (e.g., the bottom may be tilted forward). In this example, the frame pitch bumpers 226, 226' may provide a stop (e.g., which may be cushioned) for the suspended frame 102, stopping it from hitting the fixed frame 150.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Furthermore, the claimed subject matter may be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device, carrier or media. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A system for coupling a suspended boom frame to a fixed frame, the system comprising:
   the fixed frame operably, fixedly engaged to a sprayer vehicle, the fixed frame comprising one or more controllable springs, the fixed frame comprising a fixed coupling providing a pivot point;
   a suspended frame operably coupled with a pair of boom wings to form a suspended portion, the suspended frame comprising:
      a suspended coupling disposed above a center of gravity of the suspended portion, the suspended coupling providing for pivoting about the fixed coupling in roll, yaw, and pitch axes; and
      one or more dampers operably, pivotably coupled with the fixed frame to dampen movement of the suspended frame in the roll axis;
   wherein the one or more controllable springs engage with the suspended frame to control a position of the suspended frame with respect to the fixed frame.

2. The system of claim 1, the fixed frame comprising a top, fixed-frame coupling bracket that fixedly engages with the fixed coupling, the top, fixed-frame coupling bracket disposed proximate the top of the fixed frame.

3. The system of claim 1, the fixed coupling comprising a shaft that is operably fixedly engaged proximate a top of the fixed frame, disposing the shaft substantially orthogonally to the fixed frame to form the pivot point.

4. The system of claim 1, comprising one or more connecting links operably, pivotably coupled with the fixed frame to control movement of the suspended frame in the yaw axis and/or the pitch axis.

5. The system of claim 4, wherein the one or more connecting links are controllable to control a length of the connecting link.

6. The system of claim 1, the fixed coupling comprising a spherical bearing that allows for pivoting in the roll, yaw, and pitch axes.

7. The system of claim 1, the suspended coupling disposed greater than or equal to halfway from the center of gravity of the suspended portion to a top of the suspended frame.

8. The system of claim 1, the one or more controllable springs comprising an air spring that uses pressurized air to control a condition of the spring.

9. The system of claim 1, the one or more connecting links comprising a hydraulic cylinder whose length can be controlled.

10. The system of claim 1, comprising a suspended frame roll pivot stop disposed on a bracket fixed to a top of the fixed frame and configured to mitigate roll pivot of the suspended frame past a rotation angle of ten degrees.

11. The system of claim 1, comprising one or more frame pitch bumpers fixed to the fixed frame and configured to provide a stop for the suspended frame when the suspended frame pivots in a pitch axis and/or yaw axis.

12. A suspended boom frame, comprising:

a pair of boom arms that, in conjunction with the suspended boom portion, form a suspended portion;

a suspended coupling that operably, pivotably couples with a fixed coupling on a fixed frame of a boom sprayer, the suspended coupling disposed centrally above a center of gravity of the suspended portion;

a pair of connecting links respectively, operably disposed at opposing bottom corners of the suspended boom frame, the respective connecting links extending forward to operably couple with the fixed frame at opposing sides to control yaw pivot and/or pitch pivot of the suspended frame; and a pair of dampers respectively, operably extending inward toward a central bottom of the fixed frame, and operably coupled with the fixed frame to dampen roll pivot of the suspended frame.

13. The frame of claim 12, the suspended coupling comprising a spherical bearing that allows the suspended frame to pivot in the roll, yaw, and pitch axes.

14. The frame of claim 12, the pair of connecting links comprising hydraulic cylinders whose length can be controlled.

15. The frame of claim 12, comprising a pair of connecting link brackets respectively fixed to the bottom of the suspended frame at opposing corners, the connecting link brackets respectively comprising an extension arm that extends rearward, and the connecting link operably coupled with the extension arm.

16. The frame of claim 12, comprising one or more suspended frame stops disposed on the top of the suspended frame, the one or more suspended frame stops configured to control roll pivot distance of suspended frame with respect to the fixed frame by operably engaging a portion of the fixed frame, the suspended frame stops comprising one or more of:

a controllable hydraulic cylinder that can operably be extended and retracted to provide an adjustment to an amount of roll pivot distance; and a stop plate that provides a predetermined roll pivot distance.

17. A frame system for a boom sprayer, comprising:

a fixed central frame operably connected to a boom sprayer vehicle;

a suspended frame, operably connected to a pair of boom sprayer wings on either side to form a suspended portion, the suspended frame comprising a pivot point disposed above a center of gravity of the suspended portion;

a suspended coupler fixedly engaged with the suspended frame at the pivot point, the suspended coupler comprising a bearing operably, pivotably engaged with the fixed central frame to allow the suspended frame to pivot in yaw, roll, and pitch axes with respect to the fixed central frame;

a pair of connecting links respectively coupled with the suspended frame at opposing bottom corners and extending forward and coupled with the fixed frame to control yaw pivot and/or pitch pivot of the suspended frame; and a pair of dampers respectively coupled between the suspended frame and a central bottom portion of the fixed frame to control roll pivot of the suspended frame.

18. The system of claim 17, comprising one or more air springs engaged with the fixed frame and operably controlled using pressurized air to control a condition of the spring to control roll pivot of the suspended frame.

19. The system of claim 17, comprising a suspended frame roll pivot stop disposed on a bracket fixed to a top of the fixed frame and configured to control roll pivot of the suspended frame past a rotation angle of ten degrees.

20. The system of claim 17, comprising one or more frame pitch bumpers fixed to the fixed frame and configured to provide a stop for the suspended frame when the suspended frame pivots in a pitch axis and/or yaw axis.

* * * * *